United States Patent
Chaudhary et al.

(10) Patent No.: US 6,369,120 B1
(45) Date of Patent: *Apr. 9, 2002

(54) ACOUSTICAL INSULATION FOAMS

(75) Inventors: Bharat I. Chaudhary, Pearland, TX (US); Russell P. Barry, Achern (DE); Chung P. Park, Baden-Baden (DE); Martin Reimers, Buehl (DE)

(73) Assignee: The Dow Chemical Company, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/689,926

(22) Filed: Oct. 12, 2000

Related U.S. Application Data (62) Division of application No. 09/488,220, filed on Jan. 19, 2000, now Pat. No. 6,187,232, which is a continuation-in-part of application No. 09/428,575, filed on Oct. 26, 1999, now Pat. No. 6,133,333, which is a division of application No. 09/205,938, filed on Dec. 4, 1998, now Pat. No. 6,231,795.

(51) Int. Cl.$^7$ .................................................. C08J 9/20
(52) U.S. Cl. .......................... 521/59; 264/51; 264/53; 264/55; 521/79; 521/81; 521/139; 521/143
(58) Field of Search ........................... 521/59, 81, 79, 521/143, 139; 264/51, 53, 55

(56) References Cited

U.S. PATENT DOCUMENTS

| | | | |
|---|---|---|---|
| 3,504,068 A | 3/1970 | Zizlsperger et al. | 264/41 |
| 3,573,152 A | 3/1971 | Wiley et al. | 161/60 |
| 3,953,558 A | 4/1976 | Hatano et al. | 264/22 |
| 4,076,698 A | 2/1978 | Anderson et al. | 526/348.6 |
| 4,168,353 A | 9/1979 | Kitamori | 521/59 |
| 4,323,528 A | 4/1982 | Collins | 264/53 |
| 4,379,859 A | 4/1983 | Hirosawa et al. | 521/59 |
| 4,464,484 A | 8/1984 | Yoshimura et al. | 521/58 |
| 4,824,720 A | 4/1989 | Malone | 428/294 |
| 5,055,438 A | 10/1991 | Canich | 502/117 |
| 5,057,475 A | 10/1991 | Canich et al. | 502/104 |
| 5,064,802 A | 11/1991 | Stevens et al. | 502/155 |
| 5,096,867 A | 3/1992 | Canich | 502/102 |
| 5,132,380 A | 7/1992 | Stevens et al. | 526/126 |
| 5,189,192 A | 2/1993 | LaPointe et al. | 556/11 |
| 5,244,996 A | 9/1993 | Kawasaki eta l. | 526/347 |
| 5,321,106 A | 6/1994 | LaPointe | 526/126 |
| 5,347,024 A | 9/1994 | Nickias et al. | 556/11 |
| 5,350,723 A | 9/1994 | Neithamer et al. | 502/104 |
| 5,374,696 A | 12/1994 | Rosen et al. | 526/126 |
| 5,399,635 A | 3/1995 | Neithamer et al. | 526/126 |
| 5,424,016 A | 6/1995 | Kolosowski | 264/156 |
| 5,470,993 A | 11/1995 | Devore et al. | 556/11 |
| 5,652,315 A | 7/1997 | Inoue et al. | 526/153 |
| 5,703,187 A | 12/1997 | Timmers | 526/282 |
| 5,721,185 A | 2/1998 | LaPointe et al. | 502/117 |

FOREIGN PATENT DOCUMENTS

| | | | |
|---|---|---|---|
| EP | 0416815 B1 | 3/1991 | C08F/10/00 |
| EP | 0514828 B1 | 5/1992 | C07F/7/28 |
| WO | 92/19439 | 11/1992 | B29C/67/20 |
| WO | 94/00500 | 1/1994 | C08F/10/00 |
| WO | 95/32095 | 11/1995 | B32B/37/32 |
| WO | 97/22455 | 6/1997 | B29C/44/56 |
| WO | 98/09999 A3 | 3/1998 | C08F/212/08 |
| WO | 98/09999 A2 | 3/1998 | C08F/210/02 |

OTHER PUBLICATIONS

James C. Randall, *Polymer Sequence Determination* Carbon–13 NMR Method, pp. 71–78, (1977).
Frisch and Saunders, *Plastic Foams*, Part II, Marcel Dekker, Inc., pp. 544–585.
Brydson, *Plastic Materials*, $5^{th}$ edition, Butterworths, pp. 426–429, (1989).
Toru Aria et al., *Polymer Reprints*, vol. 39, No. 1, Mar. 1998.

*Primary Examiner*—Morton Foelak (57) ABSTRACT

An acoustical insulation foam having, either with or without elastification, an Asker C hardness of less than about 65, a density of about 5 to about 150 kg/m3, a cell size of about 0.05 to about 15 mm, an open cell content of 0 to about 100 volume percent, a thickness of about 1 to about 200 mm, and a width of about 100 to about 3000 mm; comprising;

(A) one or more alkenyl aromatic polymers,
(B) one or more substantially random interpolymers and
(C) optionally, one or more nucleating agents and
(D) optionally, one or more other additives; and
(E) one or more blowing agents.

3 Claims, 1 Drawing Sheet

ACOUSTICAL INSULATION FOAMS

CROSS-REFERENCE TO RELATED APPLICATIONS

This is a division of application Ser. No. 09/488,220 filed Jan. 19, 2000 now U.S. Pat. No. 6,187,232, which is a continuation-in-part of application Ser. No. 09/428,575 filed on Oct. 26, 1999 now U.S. Pat. No. 6,133,333, which is a division of application Ser. No. 09/205,938 filed on Dec. 4, 1998, now U.S. Pat. No. 6,231,795.

STATEMENT REGARDING FEDERALLY SPONSORED RESEARCH OR DEVELOPMENT

Not Applicable

FIELD OF THE INVENTION

This invention describes a method for making acoustical insulation foams by expanding blends of polymers comprising (A) alkenyl aromatic polymers, and (B) vinyl or vinylidene aromatic and/or sterically hindered aliphatic or cycloaliphatic vinyl or vinylidene substantially random interpolymers. Suitable alkenyl aromatic polymers include alkenyl aromatic homopolymers and copolymers of alkenyl aromatic compounds and copolymerizable ethylenically unsaturated comonomers. A preferred alkenyl aromatic polymer is polystyrene.

The substantially random interpolymers comprise polymer units derived from ethylene and/or one or more α-olefin monomers with specific amounts of one or more vinyl or vinylidene aromatic monomers and/or sterically hindered aliphatic or cycloaliphatic vinyl or vinylidene monomers. A preferred substantially random interpolymer is an ethylene/styrene interpolymer. Incorporation of the substantially random interpolymer in the blend with the alkenyl aromatic polymer results in an increase in the softness and flexibility of the resulting foam and an improvement in the acoutical insulation.

BACKGROUND OF THE INVENTION

Soft and flexible foams with small cell size are typically made by crosslinking and expanding polyolefins. Crosslinked olefinic foams are typically made from ethylenic polymers such as low density polyethylene, ethylene vinylacetate copolymer, homogeneous ethylene and/or α-olefin homopolymers or interpolymers comprising ethylene and/or $C_3$–$C_{20}$ α-olefins including the substantially linear ethylene/α-olefin interpolymers. These include the polyolefin plastomers, such as those marketed by The Dow Chemical Company under the AFFINITY™ tradename and polyethylene elastomers, such as those marketed under the ENGAGE™ tradename by Du Pont Dow Elastomers PLC.

Crosslinking is achieved by conventional means such as peroxides, silane and/or radiation. Some of the advantages of crosslinked foam over noncrosslinked foams are smaller cell sizes (typically less than about 1 mm), smooth skin and thermoformability. However, there are several disadvantages of crosslinked foams, such as: (1) the chemical blowing agents used (for example, azodicarbonamide) are expensive; (2) crosslinked foams expanded with nitrogen are made in energy intensive equipment at high pressures (typically about 10,000 to 30,000 psi); (3) the processes used to make the foams are typically batch processes which are expensive to operate; and (4) the foams cannot be recycled. On the other hand, non-crosslinked olefinic foams are made in continuous processes at relatively high production rates using less expensive physical blowing agents (such as isobutane) and the foams can be recycled (which is environmentally desirable), but these foams are difficult to thermoform.

It is desirable to make soft and flexible non-crosslinked foams with small cell sizes and good aesthetics that could be used as alternatives to crosslinked foams for acoustical insulation without the disadvantages listed above. We have surprisingly found that non-crosslinked foams made from blends of alkenyl aromatic polymers and specific types and amounts of substantially random interpolymers are soft and flexible with small cell sizes and function as effective acoustical insulators. Furthermore, the foams are thermoformable and can be recycled.

BRIEF SUMMARY OF THE INVENTION

The present invention pertains to acoustical insulation foams having, either with or without elastification, an Asker C hardness of less than about 65, a density of about 5 to about 150 kg/m³, a cell size of about 0.05 to about 15 mm, an open cell content of 0 to about 100 volume percent, a thickness of about 1 to about 200 mm, and a width of about 100 to about 3000 mm; comprising;

(A) one or more alkenyl aromatic polymers, and wherein at least one of said alkenyl aromatic polymers has a molecular weight ($M_w$) of from 100,000 to 500,000; and (B) one or more substantially random interpolymers having an $I_2$ of 0.1 to 50 g/10 min, an $M_w/M_n$ of 1.5 to 20; comprising;
  (1) from 8 to 45 mol percent of polymer units derived from;
    (a) at least one vinyl or vinylidene aromatic monomer, or
    (b) at least one hindered aliphatic or cycloaliphatic vinyl or vinylidene monomer, or
    (c) a combination of at least one aromatic vinyl or vinylidene monomer and at least one hindered aliphatic or cycloaliphatic vinyl or vinylidene monomer, and
  (2) from 55 to 92 mol percent of polymer units derived from at least one of ethylene and/or a $C_{3-20}$ α-olefin; and
  (3) from 0 to 20 mol percent of polymer units derived from one or more of ethylenically unsaturated polymerizable monomers other than those derived from (1) and (2); and (C) optionally, one or more nucleating agents and
(D) optionally, one or more other additives; and
(E) one or more blowing agents present in a total amount of from 0.4 to 5.0 gram-moles per kilogram (based on the combined weight of Components A and B); and
wherein said foam (either with or without elastification) has a dynamic modulus from about 100 to about 2000 KPa, and a damping ratio of greater than about 10.

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "copolymer" as employed herein means a polymer wherein at least two different monomers are polymerized to form the copolymer.

The term "interpolymer" is used herein to indicate a polymer wherein at least two different monomers are polymerized to make the interpolymer. This includes copolymers, terpolymers, etc.

The term "soft foam" is used herein to indicate a foam having an Asker C hardness of less than about 65, preferably less than about 60, more preferably less than about 55 at a foam density of about 95 kg/m$^3$ or less.

The term "small cell size" is used herein to indicate a foam having a cell size of less than about 1.8 mm.

The term "acoustical insulation foam" is used herein to indicate a foam having a dynamic modulus of less than about 2000 kPa and/or a damping ratio greater than about 10.

The term elastification" as used herein refers to the process by which the dynamic modulus, and therefore the dynamic stiffness, of a foam can be reduced somewhat by mechanically stressing the foam. This can be accomplished by compressing a foam in the range of from about 10 to about 96, preferably from about 20 to about 95, most preferably from about 40 to about 95 percent of the original thickness. Elastification tends to open cells and to crease cell struts so that the foam is softened and the dynamic stiffness correspondingly reduced.

DETAILED DESCRIPTION OF THE INVENTION

The invention especially covers foams comprising blends of one or more alkenyl aromatic homopolymers, or copolymers of alkenyl aromatic monomers, and/or copolymers of alkenyl aromatic monomers with one or more copolymerizeable ethylenically unsaturated comonomers (other than ethylene or linear $C_3$–$C_{12}$ α-olefins) with at least one substantially random interpolymer. The foams of this invention have softness and flexibility comparable to traditional cross linked olefinic foams of similar densities.

The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include homopolymers and copolymers derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

For purposes of this invention, a alkenyl aromatic polymer is a melt-processable polymer or melt processable impact-modified polymer having at least 50%, preferably at least about 70% and most preferably at least 90% of its weight in the form of polymerized vinyl aromatic monomers as represented by the structure:

wherein R is hydrogen or an alkyl radical that preferably has no more than three carbon atoms and Ar is an aromatic group. R is preferably hydrogen or methyl, most preferably hydrogen. Suitable aromatic groups Ar include phenyl and naphthyl groups. The aromatic group Ar may be substituted. Halogen (such as Cl, F, Br), alkyl (especially $C_1$–$C_4$ alkyl such as methyl, ethyl, propyl and t-butyl), $C_1$–$C_4$ haloalkyl (such as chloromethyl or chloroethyl) and alkoxyl (such as methoxyl or ethoxyl) substituents are all useful. Styrene, para-vinyl toluene, α-methyl styrene, 4-methoxy styrene, t-butyl styrene, chlorostyrene, vinyl naphthalene and the like are all useful monovinylidene aromatic monomers. Styrene is especially preferred.

The alkenyl aromatic polymer may be a homopolymer of a vinyl aromatic monomer as described above. Polystyrene homopolymers are the most preferred alkenyl aromatic polymers. Interpolymers of two or more vinyl aromatic monomers are also useful.

Although not critical, the alkenyl aromatic polymer may be characterized as having a high degree of syndiotactic configuration; i.e., the aromatic groups are located alternately at opposite directions relative to the main chain consisting of carbon-carbon bonds. Homopolymers of vinyl aromatic polymers that have syndiotacticity of 75% r diad or greater or even 90% r diad or greater as measured by 13C NMR are useful herein.

The alkenyl aromatic polymer may also contain repeating units derived from one or more other monomers that are copolymerizable with the vinyl aromatic monomer. Suitable such monomers include N-phenyl maleimide; acrylamide; ethylenically unsaturated nitriles such as acrylonitrile and methacrylonitrile; ethylenically unsaturated carboxylic acids and anhydrides such as acrylic acid, methacrylic acid, fumaric anhydride and maleic anhydride; esters of ethylenically unsaturated acids such as $C_1$–$C_8$ alkyl acrylates and methacrylates, for example n-butyl acrylate and methyl methacrylate; and conjugated dienes such as butadiene or isoprene. The interpolymers of these types may be random, block or graft interpolymers. Blends of interpolymers of this type with homopolymers of a vinyl aromatic monomer can be used. For example, styrene($C_4$–$C_8$ alkyl acrylate interpolymers and styrene-butadiene interpolymers are suitable as impact modifiers when blended into polystyrene. Such impact-modified polystyrenes are useful herein.

In addition, suitable alkenyl aromatic polymers include those modified with rubbers to improve their impact properties. The modification can be, for example, through blending, grafting or polymerization of a vinyl aromatic monomer (optionally with other monomers) in the presence of a rubber compound. Examples of suitable rubbers are homopolymers of $C_4$–$C_6$ conjugated dienes such as butadiene or isoprene; ethylene/propylene interpolymers; interpolymers of ethylene, propylene and a nonconjugated diene such as 1,6-hexadiene or ethylidene norbornene; $C_4$–$C_6$ alkyl acrylate homopolymers or interpolymers, including interpolymers thereof with a $C_1$–$C_4$ alkyl acrylate. The rubbers are conveniently prepared by anionic solution polymerization techniques or by free radical initiated solution, mass or suspension polymerization processes. Rubber polymers that are prepared by emulsion polymerization may be agglomerated to produce larger particles having a multimodal particle size distribution.

Preferred impact modified alkenyl aromatic polymers are prepared by dissolving the rubber into the vinyl aromatic monomer and any comonomers and polymerizing the resulting solution, preferably while agitating the solution so as to prepare a dispersed, grafted, impact modified polymer having rubber domains containing occlusions of the matrix polymer dispersed throughout the resulting polymerized mass. In such products, polymerized vinyl aromatic monomer forms a continuous polymeric matrix. Additional quantities of rubber polymer may be blended into the impact modified polymer if desired.

Commercial HIPS (high impact polystyrene), ABS (acrylonitrile-butadiene-styrene) and SAN (styrene-acrylonitrile) resins that are melt processable are also useful as blend components of the present invention.

The alkenyl aromatic polymer has a molecular weight such that it can be melt processed with a blowing agent to form a cellular foam structure. Preferably, the alkenyl aromatic polymer has a melting temperature of about 160° C. to about 310° C.

The term "substantially random" (in the substantially random interpolymer comprising polymer units derived from ethylene and one or more α-olefin monomers with one or more vinyl or vinylidene aromatic monomers and/or aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The interpolymers used to prepare the foams of the present invention include the substantially random interpolymers prepared by polymerizing i) ethylene and/or one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s). Suitable α-olefins include for example, α-olefins containing from 3 to about 20, preferably from 3 to about 12, more preferably from 3 to about 8 carbon atoms. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1. These α-olefins do not contain an aromatic moiety.

Other optional polymerizable ethylenically unsaturated monomer(s) include norbornene and $C_{1-10}$ alkyl or $C_{6-10}$ aryl substituted norbornene, with an exemplary interpolymer being ethylene/styrene/norbornene.

Suitable vinyl or vinylidene aromatic monomers which can be employed to prepare the interpolymers include, for example, those represented by the following formula:

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1, 4-methyl-1-pentene, hexene-1 or octene-1 are not examples of sterically hindered aliphatic or cycloaliphatic vinyl or vinylidene compounds.

The substantially random interpolymers include the pseudo-random interpolymers as described in EP-A-0,416, 815 by James C. Stevens et al. and U.S. Pat. No. 5,703,187 by Francis J. Timmers, both of which are incorporated herein by reference in their entirety. The substantially random interpolymers can be prepared by polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No.702,475, filed May 20, 1991 (EP-A-514, 828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hydrocarbyl, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl4-phenylindenyl) zirconium dichloride, racemic-dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-C1-4 alkyl, racemic-(dimethylsilanediyl)-bis-(2-methyl-4-phenylindenyl) zirconium di-C1-4 alkoxide, or any combination thereof and the like.

It is also possible to use the following titanium-based constrained geometry catalysts, [N-(1,1-dimethylethyl)-1,1-dimethyl-1-[(1,2,3,4,5-$\eta$)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-$\eta$)-1-indenyl)(tert-butylamido) dimethylsilane titanium dimethyl; and ((3-iso-propyl)(1,2,3,4,5-$\eta$)-1-indenyl)(tert-butyl amido)dimethylsilane titanium dimethyl, or any combination thereof and the like.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride (CpTiCl$_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a MgCl$_2$/TiCl$_4$/NdCl$_3$/Al (iBu)$_3$ catalyst to give random copolymers of styrene and propylene. Lu et al (*Journal of Applied Polymer Science*, Volume 53, pages 1453 to 1460 [1994]) have described the copolymerization of ethylene and styrene using a TiCl$_4$/NdCl$_3$/MgCl$_2$/Al(Et)$_3$ catalyst. Sernetz and Mulhaupt, (*Macromol. Chem. Phys.*, v. 197, pp. 1071–1083, 1997) have described the influence of polymerization conditions on the copolymerization of styrene with ethylene using Me$_2$Si (Me$_4$Cp)(N-tert-butyl)TiCl$_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of $\alpha$-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 Al to Denki Kagaku Kogyo KK. All the above methods disclosed for preparing the interpolymer component are incorporated herein by reference. Also, the copolymers of ethylene and styrene as disclosed in Polymer Preprints Vol 39, No. 1, March 1998 by Toru Aria et al. can also be employed as blend components for the foams of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is, in general, not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

Preparation of the Foams of the Present Invention

The compositions of the present invention may be used to form extruded thermoplastic polymer foam, expandable thermoplastic foam beads or expanded thermoplastic foams, and molded articles formed by expansion and/or coalescing and welding of those particles.

The foams may take any known physical configuration, such as extruded sheet, rod, plank, films and profiles. The foam structure also may be formed by molding expandable beads into any of the foregoing configurations or any other configuration.

The foams may, if required for fast cure purposes and to attain accelerated blowing agent release, be modified by introducing a multiplicity of channels or perforations into the foam extending from a surface into the foam, the channels being free of direction with respect to the longitudinal extension of the foam. Excellent teachings of such modifications are disclosed in U.S. Pat. No. 5,424,016, WO 92/19439 and WO 97/22455, the entire contents of which are herein incorporated by reference.

Foam structures may be made by a conventional extrusion foaming process. The present foam is generally prepared by melt blending in which the alkenyl aromatic polymer material and one or more substantially random interpolymers are heated together to form a plasticized or melt polymer material, incorporating therein a blowing agent to form a foamable gel, and extruding the gel through a die to form the foam product. Prior to extruding from the die, the gel is cooled to an optimum temperature. To make a foam, the optimum temperature is at or above the blends glass transition temperature or melting point. For the foams of the present invention the optimum foaming temperature is in a range in which the foam does not collapse. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The substantially random interpolymers may be dry-blended with the polymer material prior to charging to the extruder, or charged to the extruder in the form of a polymer concentrate or a interpolymer/color pigment carrier material. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the formable gel is maintained prior to extrusion through the die. The lower pressure may be superatmospheric or subatmospheric (vacuum), but is preferably at an atmospheric level.

The present foam structures may be formed in a coalesced strand form by extrusion of the compositions of the present invention through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

The present foam structures may also be formed by an accumulating extrusion process as seen in U.S. Pat. No. 4,323,528, which is incorporated by reference herein. In this process, low density foam structures having large lateral cross-sectional areas are prepared by: 1) forming under pressure a gel of the compositions of the present invention and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structures may also be formed into foam beads suitable for molding into articles by expansion of pre-expanded beads containing a blowing agent. The beads may be molded at the time of expansion to form articles of various shapes. Processes for making expanded beads and molded expanded beam foam articles are described in *Plastic Foams, Part II,* Frisch And Saunders, pp. 544–585, Marcel Dekker, Inc. (1973) and *Plastic Materials,* Brydson, 5$^{th}$ Ed., pp. 426–429, Butterworths (1989).

Expandable and expanded beads can be made by a batch or by an extrusion process. The batch process of making expandable beads is essentially the same as for manufacturing expandable polystyrene (EPS). The granules of a polymer blend, made either by melt blending or in-reactor blending, are impregnated with a blowing agent in an aqueous suspension or in an anhydrous state in a pressure vessel at an elevated temperature and pressure. The granules are then either rapidly discharged into a region of reduced pressure to expand to foam beads or cooled and discharged as unexpanded beads. The unexpanded beads are then heated to expand with a proper means, e.g., with steam or with hot air. The extrusion method is essentially the same as the conventional foam extrusion process as described above up to the die orifice. The die has multiple holes. In order to make unfoamed beads, the foamable strands exiting the die orifice are immediately quenched in a cold water bath to prevent. foaming and then pelletized. Or, the strands are converted to foam beads by cutting at the die face and then allowed to expand.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. (Some of the methods are taught in U.S. Pat. Nos. 3,504,068 and 3,953,558.) Excellent teachings of the above processes and molding methods are seen in C. P. Park, supra, p. 191, pp. 197–198, and pp. 227–229, which are incorporated herein by reference.

To make the foam beads, blends of alkenyl aromatic polymers with one or more substantially random interpolymer are formed into discrete resin particles such as granulated resin pellets and are; suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

U.S. Pat. No. 4,168,353, the entire contents of which are incorporated herein by reference, describes a process in which foamed beads are prepared from a graft polymer of polyethylene and polystyrene. Styrene monomer may also be used to form a graft polymer with one or more substantially random interpolymers and be used to prepare foam beads. The process involves (I) impregnation of styrene monomer into suspended pellets of one or more substantially random interpolymer(s) in a vessel at elevated temperature in the presence of a peroxide initiator to form a grafted polymer of polystyrene with the substantially random polymer;

(II) impregnation of the product of step I with one or more blowing agents, (III) cooling and discharging the product from step II to form unexpanded beads; and (IV) expanding and molding the beads of step III to form a foam.

Another process for making expandable thermoplastic beads comprises providing an alkenyl aromatic monomer and optionally at least one additional monomer, which is different from, and polymerizable with said alkenyl aromatic monomer; and dissolving in at least one of said monomers the substantially random interpolymers; polymerizing the first and second monomers to form thermoplastic particles; incorporating a blowing agent into the thermoplastic particles during or after polymerization; and cooling the thermoplastic particles to form expandable beads. The alkenyl aromatic monomer is present in an amount of at least about 50, preferably at least about 70, more preferably at least about 90 wt % based on the combined weights of the polymerizeable monomer(s).

Another process for making expandable thermoplastic beads comprises: heating the blends of alkenyl aromatic polymers with one or more substantially random interpolymers to form a melt polymer; incorporating into the melt polymer material at an elevated temperature a blowing agent to form a foamable gel; cooling the gel to an optimum temperature which is one at which foaming will not occur, extruding through a die containing one or more orifices to form one or more essentially continuous expandable thermoplastic strand(s); and pelletizing the expandable thermoplastic strand(s) to form expandable thermoplastic bead(s). Alternatively expanded thermoplastic foam beads may be made if, prior to extruding from the die, the gel is cooled to an optimum temperature which in this case is at or above the blends glass transition temperature or melting point. For the expanded thermoplastic foam beads of the present invention, the optimum foaming temperature is in a range sufficient to prevent foam collapse.

The present foam structures may also be used to make foamed films for bottle labels and other containers using either a blown film or a cast film extrusion process. The films may also be made by a co-extrusion process to obtain foam in the core with one or two surface layers, which may or may not be comprised of the polymer compositions used in the present invention.

Blowing agents useful in making the present foams include inorganic blowing agents, organic blowing agents and chemical blowing agents. Suitable inorganic blowing agents include nitrogen, sulfur hexafluoride ($SF_6$), argon, water, air and helium. Organic blowing agents include carbon dioxide, aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, ), 1,1-difluoroethane (HFC-152a), fluoroethane (HFC-161), 1,1,1-trifluoroethane (HFC-143a), 1,1,1,2-tetrafluoroethane (HFC-134a), 1,1,2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloro-ethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichloro-trifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine and mixtures of citric acid and sodium bicarbonate such as the various products sold under the name Hydrocerol™ (a product and trademark of Boehringer Ingelheim). All of these blowing agents may be used as single components or any mixture of combination thereof, or in mixtures with other co-blowing agents.

The amount of blowing agent incorporated into the polymer melt material to make a foam-forming polymer gel is from about 0.4 to about 5.0 gram-moles per kilogram of polymer, preferably from about 0.6 to about 3.0 gram-moles per kilogram of polymer, and most preferably from about 0.8 to 2.5 gram-moles per kilogram of polymer.

In addition, a nucleating agent may be added in order to control the size of foam cells. Preferred nucleating agents include inorganic substances such as calcium carbonate, talc, clay, silica, barium stearate, diatomaceous earth, mixtures of citric acid and sodium bicarbonate, and the like. The amount of nucleating agent employed may range from 0 to about 5 parts by weight per hundred parts by weight of a polymer resin. The preferred range is from 0 to about 3 parts by weight.

Various additives may be incorporated in the present foam structure such as inorganic fillers, pigments, antioxidants, acid scavengers, ultraviolet absorbers, flame retardants, processing aids, extrusion aids, permeability modifiers, antistatic agents, other thermoplastic polymers and the like. Examples of permeability modifiers include but are not limited to glycerol monoesters. These monoesters may also serve to reduce static during foam manufacture. Examples of other thermoplastic polymers include alkenyl aromatic homopolymers or copolymers (having molecular weight of about 2,000 to about 50,000) and ethylenic polymers.

The foam has a density of from about 10 to about 95 and most preferably from about 10 to about 80 kilograms per cubic meter according to ASTM D-1622-88.

The foams may be microcellular (i.e, with a cell size of from less than about 0.05 mm, preferably from about 0.001 to about 0.05 mm) or macrocellular (i.e., Cell size of about 0.05 mm or more). The macrocellular foam has an average cell size of from about 0.05 to about 15, preferably from about 0.1 to about 10.0, and more preferably from about 0.2 to about 5 millimeters according to ASTM D3576–77.

The present foam is particularly suited to be formed into a plank or sheet, desirably one having a thickness or minor dimension in cross-section of 1 mm or more, preferably 2 mm or more, or more preferably 2.5 mm or more. The foam width could be as large as about 1.5 meter.

The present foams have an open cell content ranging from 0 to 100 percent according to ASTM D2856–94.

The hardness of the present foams was measured using an Asker C durometer for cellular rubber and yarn in accordance with ASTM D2240–97 (but with a spherical indentor of about 5 mm diameter). The Asker C hardness was less than about 65, preferably less than about 60, more preferably less than about 55.

The foams of the present invention may be used in a variety of applications such as cushion packaging, athletic and recreational products, egg cartons, meat trays, building and construction (e.g., thermal insulation, acoustical insulation), pipe insulation, gaskets, vibration pads, luggage liners, desk pads shoe soles, gymnastic mats, insulation blankets for greenhouses, case inserts, display foams, etc. Examples of building and construction applications include external wall sheathing (home thermal insulation), roofing, foundation insulation, and residing underlayment. Other applications include insulation for refrigeration, buoyancy applications (e.g., body boards, floating docks and rafts) as well as various floral and craft applications. It should be clear, however, that the foams of this invention will not be limited to the above mentioned applications.

One preferred embodiment of the soft and flexible foams of the present invention is acoustical insulation foam. EP Patent No. 561216, discloses a potential method for the elastification of expanded polystyrene (EPS) foams. DIN 4109 describes the acoustic requirements for buildings in Germany. DIN 18164-2 is the product standard for elastified EPS in impact sound insulation, which is the dominant product for impact sound insulation of floating floor systems. However, the boards of an elastified EPS product are typically thicker than 17 mm, and even the German standard for elastified EPS in impact sound insulation applications (DIN 18164-2) does not specify elastified EPS boards with a thickness below 15 mm. Thus it would be desirable to prepare an acoustical insulation foam of thickness less than 15 mm.

Properties of the Interpolymers and Blend Compositions used to Prepare the Foams of the Present Invention.

The soft and flexible of the present invention have an Asker C hardness of less than about 65.

The molecular weight distribution ($M_w/M_n$) of the alkenyl aromatic homopolymers or copolymers used to prepare the foams of the present invention is from about 2 to about 7.

The molecular weight (Mw) of the alkenyl aromatic homopolymers or copolymers used to prepare the foams of the present invention is from about 100,000 to about 500,000, preferably of from about 120,000 to about 350,000, more preferably 130,000 to 325,000. In the case of an impact modified polymer, these molecular weight numbers refer to molecular weight of the matrix polymer (i.e., the continuous phase polymer of an alkenyl aromatic polymer).

The alkenyl aromatic polymer material used to prepare the foams of the present invention comprises greater than 50 and preferably greater than 70 weight percent alkenyl aromatic monomeric units. Most preferably, the alkenyl aromatic polymer material is comprised entirely of alkenyl aromatic monomeric units.

The melt index ($I_2$) of the substantially random interpolymer used to prepare the foams of the present invention is from about 0.1 to about 50, preferably of from about 0.3 to about 30, more preferably of from about 0.5 to about 10 g/10 min.

The molecular weight distribution ($M_w/M_n$) of the substantially random interpolymer used to prepare the foams of the present invention is from about 1.5 to about 20, preferably of from about 1.8 to about 10, more preferably of from about 2 to about 5.

In addition, minor amounts of alkenyl aromatic homopolymers or copolymers having a molecular weight of about 2,000 to about 50,000, preferably from about 4,000 to about 25,000 can be added in an amount not exceeding about 20 wt % (based on the combined weights of substantially random interpolymer and the various alkenyl aromatic homopolymers or copolymers).

Properties of the Interpolymers and Blend Compositions used to Prepare the Acoustical Insulation Foams of the Present Invention The polymer compositions used to prepare the acoustical insulation foams of the present invention comprise from about 15 to about 80, preferably from about 20 to about 70, more preferably from about 30 to about 65 wt %, (based on the combined weights of substantially random interpolymer and the alkenyl aromatic homopolymers or copolymers) of one or more substantially random interpolymers.

The polymer compositions used to prepare the acoustical insulation foams of the present invention comprise from about 20 to about 85, preferably from about 30 to about 80, more preferably from about 35 to about 70 wt %, (based on the combined weights of substantially random interpolymer and the alkenyl aromatic homopolymers or copolymer) of one or more alkenyl aromatic homopolymers or copolymers.

The acoustical insulation foams of the present invention, either with or without elastification, have an Asker C hardness less than about 65, preferably less than about 60, most preferably less than about 55.

The acoustical insulation foams of the present invention, either with or without elastification, have a density in the range of about 5 to about 150, preferably of about 6 to about 100, most preferably of about 10 to about 50 kg/m³.

The acoustical insulation foams of the present invention, either with or without elastification, may be microcellular (i.e, with a cell size of from less than about 0.05 mm, preferably from about 0.001 to about 0.05 mm) or macrocellular (i.e., cell size of about 0.05 mm or more). The macrocellular acoustical insulation foams of the present invention, either with or without elastification, have a cell size in the range of about 0.05 to about 15, preferably of about 0.1 to about 10, most preferably of about 0.2 to about 8, even more preferably from about 0.3 to about 2 mm according to ASTM D3576-77.

The acoustical insulation foams of the present invention, either with or without elastification, have an open cell content in the range of 0 to about 100, preferably of about 10 to about 95, most preferably of about 20 to about 90 volume percent.

The acoustical insulation foams of the present invention, either with or without elastification, have a thickness in the range of about 1 to about 200, preferably of about 1.5 to about 100, most preferably of about 2 to about 50 mm.

The acoustical insulation foams of the present invention, either with or without elastification, have a width in the range of about 100 to about 3000, preferably of about 250 to about 2500, most preferably of about 500 to about 2000 mm.

The acoustical insulation foams of the present invention, either with or without elastification, have a dynamic modulus from about 100 to about 2000, preferably from about 100 to about 1000, most preferably from about 100 to about 600 KPa.

The acoustical insulation foams of the present invention, either with or without elastification, have a damping ratio greater than about 10, preferably greater than about 11, most preferably greater than about 12.

The acoustical insulation foams of the present invention are advantageously (but not necessarily) elastified by a compression in the range of from about 10 to about 96, preferably from about 20 to about 95, most preferably from about 40 to about 95 percent of the original thickness. The dynamic modulus, and therefore the dynamic stiffness, of a foam can be reduced somewhat by mechanically stressing the foam, such as by compression. This process is referred to herein as "elastification". Elastification tends to open cells and to crease cell struts so that the foam is softened and the dynamic stiffness correspondingly reduced. Compression is readily accomplished by, for example, compressing the foam by about 10–96% of its original thickness through a pair of rollers or under any kind of compression system. Multiple compressions may be done in order to achieve a desired dynamic modulus or stiffness.

The foam is used as a layer of acoustical insulation in a floor or wall construction. A layer of the foam is installed in the wall or floor at which acoustical insulation is desired. The foam layer is advantageously installed in the wall or floor between weight-bearing structures and exposed surfaces. For vertical installations, the foam can be held in place with adhesives or mechanical devices such as nails, screws, staples or rivets. For horizontal installations, it is often not necessary to secure the foam to the underlying structure, although it may be so secured if desired.

Figure 1:
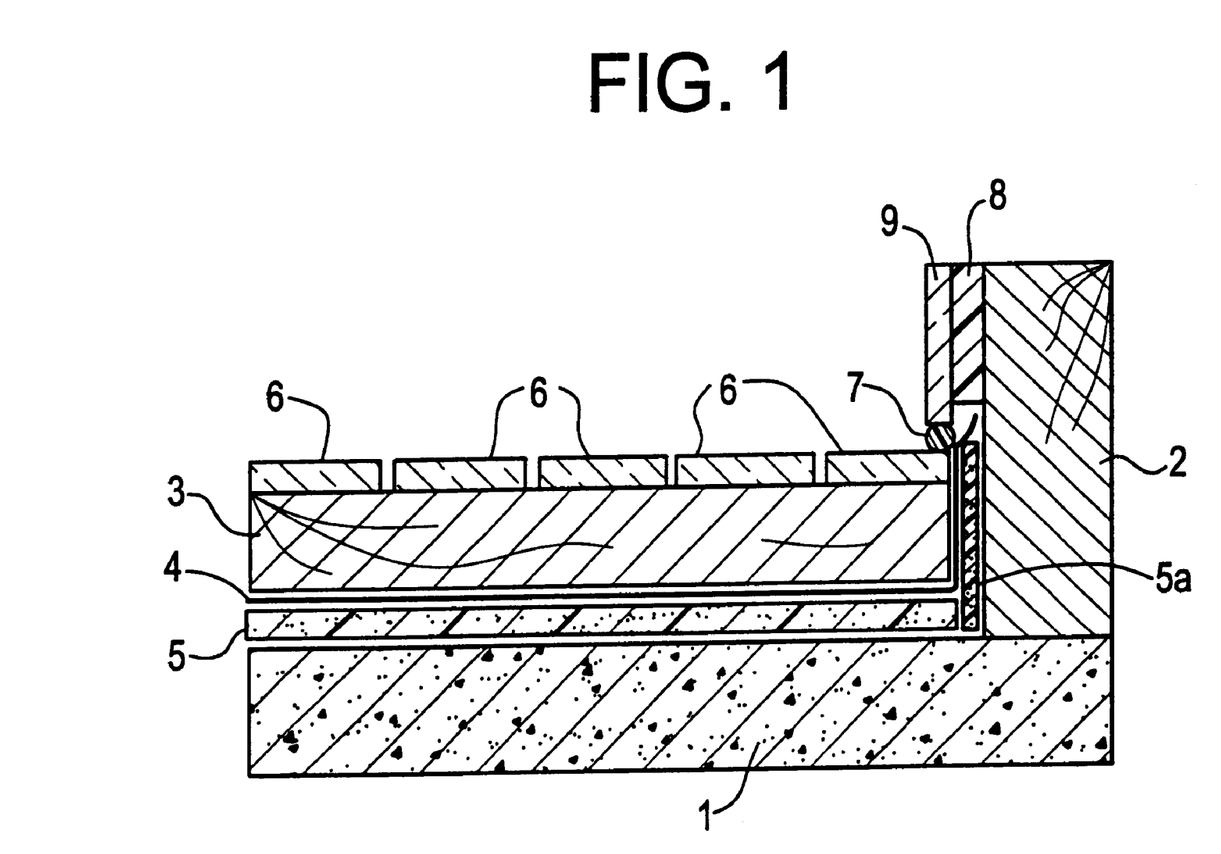
FIG. 1 is a cross-section of a floating floor construction containing a layer of acoustical insulation according to the invention.

FIG. 1 illustrates a preferred installation. In FIG. 1, structural subfloor 1 is affixed to structural wall support 2. Interior wall surface 9 is affixed to structural wall support 2 through gypsum 8. Acoustical foam layer 5 lies atop structural subfloor 1. Acoustical foam edge strip 5a is positioned at the interface of screed 3 and structural wall support 2. Optional ilm layer 4 separates screed 3 from acoustical foam layer 5 and vertical acoustical foam edge strip 5a. Exposed floor surface 6 is positioned atop screed 3. Elastic sealing bead 7 fills any remaining space between the exposed floor surface 6 and the interior wall surface 9.

Screed 3 and the exposed floor surface 6 are "floating" in the sense that they are not affixed to the structural subfloor 1 or the structural wall support 2.

The floating floor system illustrated in FIG. 1 is conveniently installed by first building the structural subfloor 1 and structural wall support 2. The structural subfloor 1 can be made of any suitable building material, including concrete, reinforced concrete, wood, steel, aluminum, plywood, particle board, plasterboard, fibrous-reinforced gypsum playtes oriented strand boards and the like. Concrete and reinforced concrete subfloors are preferred. Acoustical foam layer 5 is installed over the subfloor 1. Advantageously, substantially the entire surface of the subfloor is covered with acoustical foam layer 5. Holes may be provided for services such as water, drains, electrical, cables, ducts, vents, and the like which must not get in contact with screed 3. In addition, the periphery of the floor is also lined with acoustical foam edge strip 5a, which extends upward along the structural wall support 2 to a height at least equal to that of the floating floor (i.e., The combined height of acoustical foam layer 5, film layer 4, screed 3 and exposed floor surface 6). As mentioned, acoustical foam layer 5 and acoustical foam edge strip 5a may be simply laid into place, or may be secured to subfloor 1 and/or structural wall support 2 though adhesive or mechanical means.

As shown in FIG. 1, film layer 4 is then installed over the acoustical foam layer 5 and acoustical foam edge strip 5a. Screed 3 is of a structural material whose purpose is to provide a dimensionally stable support for the exposed floor surface as well as to provide mass that assists in the overall acoustical performance of the floor. Screed 3 is commonly a concrete-type or reinforced concrete-type that is poured in place over the previously-installed acoustical foam. Film layer 4 provides a continuous surface over which the concrete can be poured, so that the concrete does not leak through spaces between separate pieces of foam that make up acoustical foam layer 5, or between acoustical foam layer 5 and edge strips 5a. This prevents concrete bridges between screed 3 and subfloor 1 from being formed. Such bridges readily transmit sound, so their formation is to be avoided. Instead of using film layer 4, acoustical foam layer 5 and edge strips 5a can be taped at all seams, so that those spaces are sealed and leakage of the concrete is prevented.

Screed 3 can also be made from prefabricated gypsum plates, fiber reinforced gypsum plates or wood (such as a parquet floor). In this case, it is convenient to attached acoustical layer 5 to the plates or wood pieces prior to installation. In this manner, acoustical layer 5 and screed 3 can be installed simultaneously. Screed 3 can also take the form of ceramic or other tiles embedded in a mortar bed.

In all cases, screed 3 is installed in such a way that it "floats" over acoustical foam layer 5 and is not affixed to structural subfloor I or structural wall support 2.

Acoustical foam layer 5 and foam edge strip 5a are each advantageously from about 1 to about 30, preferably from about 3 to about 25, more preferably about 3 to about 20 mm thick.

The following examples are illustrative of the invention, but are not to be construed as to limiting the scope thereof in any manner.

EXAMPLES

Test Methods a) Melt Flow and Density Measurements

The molecular weight of the substantially random interpolymers used in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

Also useful for indicating the molecular weight of the substantially random interpolymers used in the present invention is the Gottfert melt index (G, $cm^3/10$ min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8% to 81.8% by weight styrene. Atactic polystyrene levels in these samples was typically 10% or less. The influence of the atactic polystyrene was assumed to be minimal because of the low levels. Also, the melt density of atactic polystyrene and the melt densities of the samples with high total styrene are very similar. The method used to determine the melt density employed a Gottfert melt index machine with a melt density parameter set to 0.7632, and the collection of melt strands as a function of time while the 12 weight was in force. The weight and time for each melt strand was recorded and normalized to yield the mass in grams per 10 minutes. The instrument's calculated 12 melt index value was also recorded. The equation used to calculate the actual melt density is $$\delta = \delta_{0.7632} \times I_2/I_2 \text{ Gottfert}$$

where $\delta_{0.7632} = 0.7632$ and $I_2$ Gottfert=displayed melt index.

A linear least squares fit of calculated melt density versus total styrene content leads to an equation with a correlation coefficient of 0.91 for the following equation:

$$\delta = 0.00299 \times S + 0.723$$

where S=weight percentage of styrene in the polymer. The relationship of total styrene to melt density can be used to determine an actual melt index value, using these equations if the styrene content is known.

So for a polymer that is 73% total styrene content with a measured melt flow (the "Gottfert number"), the calculation becomes:

$$\delta = 0.00299 * 73 + 0.723 = 0.9412$$

where $$0.9412/0.7632 = I_2/G\#(\text{measured}) = 1.23$$

b) Styrene Analyses

Interpolymer styrene content and the concentration of atactic polystyrene hompolymer impurity in the ESI interpolymers are determined using proton nuclear magnetic resonance ($^1$H NMR). All proton NMR samples are prepared in 1, 1, 2, 2-tetrachloroethane-$d_2$ (tce-$d_2$). The resulting solutions contain 1.6 weight percent polymer for ESI-1 and 2.4 for ESI-2. The interpolymers are weighed directly into 5-mm sample tubes. A 0.75-ml aliquot of tce-$d_2$ is added by syringe and the tube is capped with a tight-fitting cap. The samples are heated at 85° C. to soften the interpolymer. To provide mixing, the capped samples are occasionally brought to reflux using a heat gun.

Proton NMR spectra are accumulated with the sample probe at 80° C., and referenced to the residual protons of tce-d$_2$ at 5.99 ppm. Data is collected in triplicate on each sample. The following instrumental conditions are used for analysis of the interpolymer samples:

Sweep width, 5000 hz
Acquisition time, 3.002 sec
Pulse width, 8 $\mu$sec
Frequency, 300 mhz
Delay, 1 sec
Transients, 16

The total analysis time per sample is about 10 minutes.

Initially, a spectrum for a sample of a 192,000 $M_w$ polystyrene is acquired. Polystyrene has five different types of protons that are distinguishable by proton NMR. In FIG. 1, these protons are labeled b, branch; $\alpha$, alpha; o, ortho; m, meta; p, para, as shown in FIG. 1. For each repeating unit in the polymer, there are one branch proton, two-alpha protons, two ortho protons, two meta protons and one para proton.

FIG. 1

The NMR spectrum for polystyrene homopolymer includes a resonance centered around a chemical shift of about 7.1 ppm, which is believed to correspond to the three ortho and para protons. It includes another peak centered around a chemical shift of about 6.6 ppm. That peak corresponds to the two meta protons. Other peaks at about 1.5 and 1.9 ppm correspond to the three aliphatic protons (alpha and branch).

The relative intensities of the resonances for each of these protons are determined by integration. The integral corresponding to the resonance at 7.1 ppm is designated $PS_{7.1}$ below. That corresponding to the resonance at 6.6 ppm is designated $PS_{6.6}$ and that corresponding to the aliphatic protons (integrated from 0.8–2.5 ppm) is designated $PS_{al}$. The theoretical ratio for $PS_{7.1}$: $PS_{6.6}$: $PS_{al}$ is 3:2:3, or 1.5:1:1.5. For atactic polystyrene homopolymer, all spectra collected have the expected 1.5:1:1.5 integration ratio. An aliphatic ratio of 2 to 1 is predicted based on the protons labeled $\alpha$ and b respectively in FIG. 1. This ratio is also observed when the two aliphatic peaks are integrated separately. Further, the ratio of aromatic to aliphatic protons is measured to be 5 to 3, as predicted from theoretical considerations.

Then, the $^1$H NMR spectrum for the ESI interpolymer is acquired. This spectrum shows resonances centered at about 7.1 ppm, 6.6 ppm and in the aliphatic region. However, the 6.6 ppm peak is relatively much weaker for the ESI interpolymer than for the polystyrene homopolymer. The relative weakness of this peak is believed to occur because the meta protons in the ESI copolymer resonate in the 7.1 ppm region. Thus, the only protons that produce the 6.6 ppm peak are meta protons associated with atactic polystyrene homopolymer that is an impurity in the ESI. The peak centered at about 7.1 ppm thus includes ortho, meta and para protons from the aromatic rings in the ESI interpolymer, as well as the ortho and para protons from the aromatic rings in the polystyrene homopolymer impurity. The peaks in the aliphatic region include resonances of aliphatic protons from both the ESI interpolymer and the polystyrene homopolymer impurity.

Again, the relative intensities of the peaks are determined by integration. The peak centered around 7.1 ppm is referred to below as $I_{7.1}$, that centered around 6.6 ppm is $I_{6.6}$ and that in the aliphatic regions is $I_{al}$.

$I_{7.1}$ includes a component attributable to the aromatic protons of the aromatic protons of the ESI interpolymer and a component attributable to the ortho and para protons of the aromatic rings of the polystyrene homopolymer impurity. Thus, $$I_{7.1}=I_{c7.1}+I_{ps7.1}$$

where $I_{c7.1}$ is the intensity of the 7.1 ppm resonance attributable to the aromatic protons in the interpolymer and $I_{ps7.1}$ is the intensity of the 7.1 ppm resonance attributable to the ortho and meta protons of the polystyrene homopolymer.

From theoretical considerations, as confirmed by the $^1$H NMR spectrum of the polystyrene homopolymer, the intensity of the 7.1 ppm resonance attributable to the polystyrene homopolymer impurity ($I_{ps7.1}$), equals 1.5 times the intensity of the 6.6 ppm resonance. This provides a basis for determining $I_{c7.1}$ from measured values, as follows:

$$I_{c7.1}=I_{7.1}-1.5(I_{6.6}).$$

Similarly, $I_{al}$ can be resolved into resonances attributable to the ESI and the polystyrene homopolymer impurity using the relationship $$I_{al}=I_{cal}+I_{psal}$$

wherein $I_{cal}$ is the intensity attributable to the aliphatic protons on the interpolymer and $I_{psal}$ is the intensity attributable to the aliphatic protons of the polystyrene homopolymer impurity. Again, it is known from theoretical considerations and the spectrum from the atactic polystyrene homopolymer that $I_{psal}$ will equal 1.5 times $I_{6.6}$. Thus the following relationship provides a basis for determining $I_{cal}$ from measured values:

$$I_{cal}=I_{al}-1.5(I_{6.6})$$

The mole percent ethylene and styrene in the interpolymer are then calculated as follows:

$$s_c=I_{c7.1}/5$$

$$e_c=(I_{cal}-(3 \times s_c))/4$$

$$E=e_c/(s_c+e_c),$$

and $$S=s_c/(s_c+e_c),$$

wherein E and S are the mole fractions of copolymerized ethylene and styrene, respectively, contained in the interpolymer.

Weight percent ethylene and styrene are calculated using the equations $$\text{Wt \% } E = \frac{100\% * 28E}{(28E + 104S)} \text{ and}$$

$$\text{Wt \% } S = \frac{100\% * 104S}{(28E + 104S)}.$$

The weight percent of polystyrene homopolymer impurity in the ESI sample is then determined by the following equation:

$$\text{Wt \% } PS = \frac{100\% * \text{Wt \% } S * (I_{6.6}/2S)}{100 - [\text{Wt \% } S * (I_{6.6}/2S)]}.$$

The total styrene content was also determined by quantitative Fourier Transform Infrared spectroscopy (FTIR). Preparation of Ethylene/Styrene Interpolymers ("ESI's") used in Examples and Comparative Experiments of Present Invention 1) Preparation of ESI #'s 1–7

ESI #'s 1–7 are substantially random ethylene/styrene interpolymers prepared using the following catalysts.

Preparation of Catalyst A (dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium)

1) Preparation of 3,5,6,7-Tetrahydro-s-Hydrindacen-1(2H)-one

Indan (94.00 g, 0.7954 moles) and 3-chloropropionyl chloride (100.99 g. 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield).

$^1$H NMR ($CDCl_3$): d2.04–2.19 (m, 2 H), 2.65 (t, $^3J_{HH}$=5.7 Hz, 2 H), 2.84–3.0 (m, 4 H), 3.03 (t, $^3J_{HH}$=5.5 Hz, 2 H), 7.26 (s, 1 H), 7.53 (s, 1 H).

$^{13}$C NMR ($CDCl_3$): d25.71, 26.01, 32.19, 33.24, 36.93, 118.90, 122.16, 135.88, 144.06, 152.89, 154.36, 206.50. GC-MS: Calculated for $C_{12}H_{12}O$ 172.09, found 172.05.

2) Preparation of 1,2,3,5-Tetrahydro-7-phenyl-s-indacen 3,5,6,7-Tetrahydro-s-Hydrindacen-1(2H)-one (12.00 g, 0.06967 moles) was stirred in diethyl ether (200 mL) at 0° C. as PhMgBr (0.105 moles, 35.00 mL of 3.0 M solution in diethyl ether) was added slowly. This mixture was then allowed to stir overnight at room temperature. After the reaction period the mixture was quenched by pouring over ice. The mixture was then acidified (pH=1) with HCl and stirred vigorously for 2 sours. The organic layer was then separated and washed with $H_2O$ (22×100 mL) and then dried over $MgSO_4$. Filtration followed by the removal of the volatiles resulted in the isolation of the desired product as a dark oil (14.68 g, 90.3% yield).

$^1$H NMR ($CDCl_3$): d2.0–2.2 (m, 2 H), 2.8–3.1 (m, 4 H), 6.54 (s, 1H), 7.2–7.6 (m, 7 H). GC-MS: Calculated for $C_{18}H_{16}$ 232.13, found 232.05.

3) Preparation of 1,2,3,5-Tetrahydro-7-phenyl-s-indacene, dilithium salt 1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

4) Preparation of Chlorodimethyl(1,5,6,7-tetrahydro-3-phenyl-s-indacen-1-yl)silane 1,2,3,5-Tetrahydro-7-phenyl-s-indacene, dilithium salt (12.2075 g, 0.05102 moles) in THF (50 mL) was added dropwise to a solution of $Me_2SiCl_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield).

$^1$H NMR ($CDCl_3$): d0.33 (s, 3 H), 0.38 (s, 3 H), 2.20 (p, $^3J_{HH}$=7.5 Hz, 2 H), 2.9–3.1 (m, 4 H), 3.84 (s, 1 H), 6.69 (d, $^3J_{HH}$=2.8 Hz, 1 H), 7.3–7.6 (m, 7 H), 7.68 (d, $^3J_{HH}$=7.4 Hz, 2 H).

$^{13}$C NMR ($CDCl_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for $C_{20}H_{21}ClSi$ 324.11, found 324.05.

5) Preparation of N-(1,1-Dimethylethyl)-1,1-dimethyl-1-(1,5,6,7-tetrahydro-3-phenyl-s-indacen-1-yl)silanamine Chlorodimethyl(1,5,6,7-tetrahydro-3-phenyl-s-indacen-1-yl)silane (10.8277 g, 0.03322 moles) was stirred in hexane (150 mL) as $NEt_3$ (3.5123 g, 0.03471 moles) and t-butylamine (2.6074 g, 0.03565 moles) were added. This mixture wa3 allowed to stir for 24 hours. After the reaction period the mixture was (filtered and the volatiles removed resulting in the isolation of the desired product as a thick red-yellow oil (10.6551 g, 88.7% yield).

$^1$H NMR ($CDCl_3$): d0.02 (s, 3 H), 0.04 (s, 3 H), 1.27 (s, 9 H), 2.16 (p, $^3J_{HH}$=7.2 Hz, 2 H), 2.9–3.0 (m, 4 H), 3.68 (s, 1 H), 6.69 (s, 1 H), 7.3–7.5 (m, 4 H), 7.63 (d, $^3J_{HH}$=7.4 Hz, 2 H).

$^{13}$C NMR ($CDCl_3$): d–0.32, –0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

6) Preparation of N-(1,1-Dimethylethyl)-1,1-dimethyl-1-(1,5,6,7-tetrahydro-3-phenyl-s-indacen-1-yl) silanamine, dilithium salt N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

7) Preparation of Dichloro[N-(1,1-dimethylethyl)-1, 1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of $TiCl_3(THF)_3$ (4.5005 g, 0.01214 moles) in THF (100 mL). This mixture was allowed to stir for 2 hours. $PbCl_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2:5280 g, 43.5% yield).

$^1$H NMR ($CDCl_3$): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t, $^3J_{HH}$=7.8 Hz, 2 H), 7.57 (s, 1 H), 7.70 (d, $^3J_{HH}$=7.1 Hz, 2 H), 7.78 (s, 1 H).

$^1$H NMR ($C_6D_6$): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3J_{HH}$=7.1 Hz, 2 H), 7.61 (s, 1 H), 7.69 (s, 1 H), 7.77–7.8 (m, 2 H).

$^{13}$C NMR ($CDCl_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93.

$^{13}$C NMR ($C_6D_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1, 1-dimethyl-1-[(1,2,3,4,5-η)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1$H NMR ($C_6D_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3J_{HH}$=7.4 Hz, 2 H), 7.48 (s, 1 H), 7.72 (d, $^3J_{HH}$=7.4 Hz, 2 H), 7.92 (s, 1 H).

$^{13}$C NMR ($C_6D_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Preparation of Catalyst B;(1H-cyclopenta[1]phenanthrene-2-yl)dimethyl(t-butylamido)-silanetitanium 1,4-diphenylbutadiene)

1) Preparation of lithium 1H-cyclopenta[1]phenanthrene-2-yl

To a 250 ml round bottom flask containing 1.42 g (0.00657 mole) of 1H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl)dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[1]phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3. Preparation of (1H-cyclopenta[1]phenanthrene-2-yl)dimethyl(t-butylamino)silane To a 500 ml round bottom flask containing 1.98 g (0.0064 mole) of(1H-cyclopenta[1]phenanthrene-2-yl) dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4. Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5. Preparation of (1H-cyclopenta[1]phenanthrene-2-yl)dimethyl(t-butylamido)silanetitanium dichloride To a 250 ml round bottom flask containing 1.17 g (0.0030 mole) of $TiCl_3.3THF$ and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6. Preparation of (1H-cyclopenta[1]phenanthrene-2-yl)dimethyl(t-butylamido)silanetitanium 1,4-diphenylbutadiene To a slurry of (1H-cyclopenta[1]phenanthrene-2-yl) dimethyl(t-butylamido)silanetitanium dichloride (3.48 g, 0.0075 mole) and 1.551 gm (0.0075 mole) of 1,4-diphenyllbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours. The mixture was cooled to about −25° C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about −20° C. isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

Polymerization for ESI #'s 1–2

ESI's 1–2 were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream.

Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor.

The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. The flow was adjusted to maintain the desired ethylene conversion. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

Polymerization for ESI's 3–7

ESI's 3–7 were prepared in a continuously operating loop reactor (36.8 gal. 139 L). An Ingersoll-Dresser twin screw pump provided the mixing. The reactor ran liquid full at 475 psig (3,275 kPa) with a residence time of approximately 25 minutes. Raw materials and catalyst/cocatalyst flows were fed into the suction of the twin screw pump through injectors and Kenics static mixers. The twin screw pump discharged into a 2" diameter line which supplied two Chemineer-Kenics 10–68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil was circulated through the exchangers' jacket to control the loop temperature probe located just prior to the first exchanger. The exit stream of the loop reactor was taken off between the two exchangers. The flow and solution density of the exit stream was measured by a MicroMotion.

Solvent feed to the reactor was supplied by two different sources. A fresh stream of toluene from an 8480-S-E Pulsafeeder diaphragm pump with rates measured by a Micro-Motion flowmeter was used to provide flush flow for the reactor seals (20 lb/hr (9.1 kg/hr)). Recycle solvent was mixed with uninhibited styrene monomer on the suction side of five 8480-5-E Pulsafeeder diaphragm pumps in parallel. These five Pulsafeeder pumps supplied solvent and styrene to the reactor at 650 psig (4,583 kPa). Fresh styrene flow was measured by a MicroMotion flowmeter, and total recycle solvent/styrene flow was measured by a separate MicroMotion flowmeter. Ethylene was supplied to the reactor at 687 psig (4,838 kPa). The ethylene stream was measured by a Micro-Motion mass flowmeter. A Brooks flowmeter/controller was used to deliver hydrogen into the ethylene stream at the outlet of the ethylene control valve.

The ethylene/hydrogen mixture combined with the solvent/styrene stream at ambient temperature. The temperature of the entire feed stream as it entered the reactor loop was lowered to 2° C. by an exchanger with −10° C. glycol on the jacket. Preparation of the three catalyst components took place in three separate tanks: fresh solvent and concentrated catalyst/cocatalyst premix were added and mixed into their respective run tanks and fed into the reactor via variable speed 680-S-AEN7 Pulsafeeder diaphragm pumps. As previously explained, the three component catalyst system entered the reactor loop through an injector and static mixer into the suction side of the twin screw pump. The flow was adjusted to maintain the desired ethylene conversion. The raw material feed stream was also fed into the reactor loop through an injector and static mixer downstream of the catalyst injection point but upstream of the twin screw pump suction.

Polymerization was stopped with the addition of catalyst kill (water mixed with solvent) into the reactor product line after the Micro Motion flowmeter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to 450 mmHg (60 kPa) of absolute pressure at the reactor pressure control valve.

This flashed polymer entered the first of two hot oil jacketed devolatilizers. The volatiles flashing from the first devolatizer were condensed with a glycol jacketed exchanger, passed through the suction of a vacuum pump, and were discharged to the solvent and styrene/ethylene separation vessel. Solvent and styrene were removed from the bottom of this vessel as recycle solvent while ethylene exhausted from the top. The ethylene stream was measured with a MicroMotion mass flowmeter. The measurement of vented ethylene plus a calculation of the dissolved gases in the solvent/styrene stream were used to calculate the ethylene conversion. The polymer and remaining solvent separated in the devolatilizer was pumped with a gear pump to a second devolatizer. The pressure An the second devolatizer was operated at 5 mm Hg (0.7 kPa) absolute pressure to flesh the remaining solvent. This solvent was condensed in a glycol heat exchanger; pumped through another vacuum pump, and exported to a waste tank for disposal. The dry polymer (<1000 ppm total volatiles) was pumped with a gear pump to an underwater pelletizer with 6-hole die, pelletized, spin-dried, and collected in 1000 lb boxes.

The various catalysts, co-catalysts and process conditions used to prepare the various individual ethylene styrene interpolymers (ESI #'s 1–7) are summarized in Table 1 and their properties are summarized in Table 2.

TABLE 1

Preparation Conditions for ESI #'s 1–7

| ESI # | Reactor Temp °C. | Solvent Flow lb/hr | Ethylene Flow lb/hr | Hydrogen Flow sccm | Styrene Flow lb/hr | Ethylene Conversion % | B/Ti Mol Ratio | MMAO[d]/ Ti Mol Ratio | Catalyst | Co-Catalyst |
|---|---|---|---|---|---|---|---|---|---|---|
| ESI 1 | 93.0 | 37.9 | 3.1 | 13.5 | 6.9 | 96.21 | 2.99 | 7.0 | A[a] | C[c] |
| ESI 2 | 79.0 | 31.3 | 1.74 | 4.3 | 13.5 | 95.1 | 3.51 | 9.0 | A[a] | C[c] |
| ESI-3 | 88.0 | 590 | 55 | 250 | 133 | 94.0 | 3.50 | 4.9 | B[b] | C[c] |
| ESI-4 | 83.0 | 445 | 43 | 235 | 91 | 94.0 | 3.50 | 4.9 | B[b] | C[c] |
| ESI-5 | 61.0 | 386 | 20 | 0 | 100 | 88 | 3.50 | 2.5 | B[b] | C[c] |
| ESI-6 | 87.0 | 800 | 83 | 569 | 197 | 93.0 | 4.00 | 6.0 | B[b] | C[c] |
| ESI-7 | 81.0 | 799 | 65 | 500 | 247 | 95 | 3.70 | 6.0 | B[b] | C[c] |

*N/A = not available
[a]Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium.
[b]Catalyst B is; (1H-cyclopenta[1]phenanthrene-2-yl)dimethyl(t-butylamido)-silanetitanium 1,4-diphenylbutadiene)
[c]Cocatalyst C is tris(pentafluorophenyl)borane, (CAS #001109-15-5).
[d]a modified methylaluminoxane commercially available from Akzo Nobel as MMAO-3A (CAS #146905-79-5)

TABLE 2

Properties of ESI #'s 1–7.

| ESI # | wt. % Copolymer Styrene | mol. % Copolymer Styrene | aPS wt % | Melt Index, $I_2$ (g/10 min) | G # (cm$^3$/10 min) |
|---|---|---|---|---|---|
| ESI-1 | 47.4 | 19.5 | 0.5 | | 1.54 |
| ESI-2 | 69.0 | 37.5 | 1.6 | | 1.36 |
| ESI-3 | 44.6 | 17.8 | 11.5 | 1.52 | |
| ESI-4 | 63.7 | 32.1 | N/A | 0.61 | |
| ESI-5 | 69.5 | 38.0 | 8.9 | 0.94 | |
| ESI-6 | 61.7 | 30.2 | 2.9 | 0.63 | |
| ESI-7 | 70.6 | 39.3 | 6.1 | 1.17 | |

Additional Blend Components

PS 1 is a granular polystyrene having a weight average molecular weight, Mw, of about 192,000 and a polydispersity, $M_w/M_n$, of about 2.

PS 2 is a granular polystyrene having a weight average molecular weight, Mw, of about 305,000 and a polydispersity, $M_w/M_n$, of about 2.

LDPE 1 is a low density polyethylene having a melt index, $I_2$, of 1.8 g/10 min, a weight-average molecular weight of 117,600, a number-average molecular weight of 17,200 and a density of 0.9230 g/cm$^3$.

LDPE 2 is a low density polyethylene having a melt index, $I_2$, of 2.4 g/10 min, a weight-average molecular weight of 98,300, a number-average molecular weight of 13,300 and a density of 0.9241 g/cm$^3$.

EXAMPLES 1–4

A foaming process comprising a single-screw extruder, mixer, coolers and die was used to make foam. Isobutane was used as the blowing agent at a level of 7.5 part-per-hundred resin (phr) to foam LDPE and PS/ESI blends. Table 3 summarizes the foam properties, all of which foams were soft and flexible to the touch while having small cell size, smooth skin, good dimensional stability, and a wide range of open cell contents. The foams of the present invention (Ex. 1–4) did not shrink significantly as measured by volume change (computed from measurements of foam mass and density) when cured at room temperature unlike the comparative non-crosslinked foam made form LDPE (Comp. Ex 1).

loading of 0.06 phr. In the case of Comparative Example 2, additional additives were 0.2 phr of Hydrocerol™ (a product and trademark of Boehringer Ingelheim) CF40E as nucleator, and 0.5 phr of glycerol monostearate as permeability modifier. For Comparative Example 3, the additives used were: hexabromocyclo-dodecane=2.5 phr; barium stearate=0.2 phr; blue pigment=0.15 phr; tetra-sodiumpyrophosphate=0.2 phr; linear low density polyethylene=0.4 phr The examples in Table 4 were soft and flexible, close in Asker C hardness to a conventional LDPE foam used for cushion packaging (Comparative Example 2) and much softer than a foam made from an 80/20 blend of polystyrene/ESI (Comparative Example 3).

TABLE 3

PS/ESI blends, using Isobutane as Blowing Agent.

| Ex # | Blend Composition wt % | Foaming temp ° C. | foam density kg/m3 | % open cells | Cell size mm | Max Vol Change at 23° C. (vol %) |
|---|---|---|---|---|---|---|
| Ex 1 | 50% PS1/50% ESI 1 | 122 | 46.2 | 54.6 | 0.21 | −3.2 |
| Ex 2 | 50% PS1/50% ESI 1 | 112 | 54.7 | 87.3 | 0.30 | −3.2 |
| Ex 3 | 50% PS1/50% ESI 2 | 112 | 65.2 | 81.1 | 0.09 | −3.4 |
| Ex 4 | 50% PS1/50% ESI 2 | 102 | 74.4 | 65.9 | 0.12 | −2.3 |
| Comp Ex. 1 | 100% LDPE 1 | 112 | 37.7 | 4.5 | 1.63 | −28.5 |

EXAMPLE 5–9

A foaming process comprising a single-screw extruder, mixer, coolers and die was used to make foam planks. Isobutane and HCFC-142b were used as blowing agents to foam LDPE and blends of polystyrene with ESI. For Examples 5–9 and Comparative Example 2, Irganox™ 1010 (a product and trademark of Ciba-Geigy) was used at a

TABLE 4

PS/ESI blends,

| Ex # | Blend Composition wt % | Blowing Agent | Foaming temp ° C. | foam density after 60 days kg/m3 | thickness (mm) | width (mm) | % open cells | Av. cell size mm | Average Compressive strength kPa (25% compression, ASTM 3575) after 60 days |
|---|---|---|---|---|---|---|---|---|---|
| Ex 5 | 60% PSI/40% ESI 3 | 10 phr isobutane | 114 | 25.9 | 13 | 170 | 2.3 | 0.57 | 97 |
| Ex 6 | 60% PSI/40% ESI 4 | 10 phr isobutane | 114 | 25.1 | 22 | 160 | 4.3 | 0.46 | 93 |
| Ex 7 | 50% PSI/50% ESI 4 | 10 phr isobutane | 115 | 24.6 | 21 | 158 | 30.8 | 0.51 | 52 |
| Ex 8 | 50% PSI/50% ESI 4 | 10 phr isobutane | 114 | 24.6 | 22 | 160 | 34.4 | 0.48 | 56 |
| Ex 9 | 50% PSI/50% ESI 4 | 10 phr isobutane | 110 | 28.8 | 20 | 150 | 58.3 | 0.62 | 46 |
| Comp Ex. 2 | 100% LDPE 2 | 10 phr isobutane | 111 | 29.8 | 21 | 146 | 17.7 | 1.23 | 63 |
| Comp Ex. 3 | 80% PSI/20% ESI 5 | 13 phr HCFC-142b | 121 | 32.0 | 39 | 145 | 9.4 | 0.26 | N/A |

| Ex. # | Compression Set (%) after 60 days (DIN 53572) | Hardness (Asker C) | Max. Linear Change at 70° C. (%) | Lambda (10° C.) mW/mK |
|---|---|---|---|---|
| Ex. 5 | 6.8 | 45 | +2.0 | 32.6 |
| Ex 6 | 4.7 | 43 | −1.2 | 31.8 |
| Ex 7 | 15.3 | 32 | −2.8 | 34.2 |
| Ex 8 | 17.2 | 33 | −2.6 | 34.7 |
| Ex 9 | 17.4 | 33 | −3.2 | 34.3 |
| Comp Ex. 2 | 5.2 | 28 | −1.0 | N/A |
| Comp Ex. 3 | N/A | 67 | N/A | 28.3 |

EXAMPLE 10

A foaming process comprising a single-screw extruder, mixer, coolers and die was used to make foam planks. Isobutane or isobutane/carbon dioxide mixtures were used as blowing agents to foam blends of polystyrene with ESI. The foams were soft and flexible with smooth skin, small cells and Asker C hardness of about 50 or less.

TABLE 5

PS/ESI blends using Isobutane and/or $CO_2$ as Blowing Agents

| Ex # | Blend Composition wt % | Blowing Agent | Foaming temp ° C. | foam density after 7 days kg/m3 | thickness (mm) | width (mm) | % open cells (ASTM D2856-94) | Av. Cell size mm | Total Compressive strength kPa after 2 days (ASTM D1621 94) | Hardness (Asker C) |
|---|---|---|---|---|---|---|---|---|---|---|
| Ex 10 | 50% PS2/50 ESI 6 | 8.6 phr isobutane and 1 phr CO2 | 115 | 29.17 | 27 | 93 | 81.1 | 0.44 | 354 | 40 |
| Ex. 11 | 50% PS2/50 ESI 7 | 10 phr isobutane | 120 | 28.05 | 20 | 93 | 22.3 | 0.52 | 973 | 50 |

EXAMPLE 12
Foams used as Acoustical Insulator

The foam of Example 7 was elastified and its acoustical performance was compared to that of an elastified expanded polystyrene (EPS) foam (Techmate™ AC a product and registered trademark of The Dow Chemical Company. The foam of Example 7 was elastified by passing between two steel rolls (with a gap of 15% of the original foam thickness) three times thus compressing the material by 85%. The pull rate of the rolls was 2 m/sec. No holding time was applied, the foam was just passed through the rollers. A 10-minute interval was allowed between each elastification step The elastified samples were of approximately 10 mm thickness. The foam had a vertical compressive strength (at 25% compression) of 24 kPa after elastification. The compressive strength was measured per a method described in ASTM D 3575.

As shown in Table 6, the foam of Example 12 shows the same impact sound reduction as the thicker elastified EPS foam at a significantly higher dynamic stiffness and at a significantly smaller thickness. The 25 dB reduction in impact sound obtained with the foam of Example 12 was surprisingly high. The result was unexpected because the measured dynamic stiffness of the material (52 MN/m³) in combination with the used screed mass of 100 kg/m² was anticipated to result in an impact sound reduction level ΔLw of 22 dB. under prEN 12354-2:1996. The test was performed at "Fraunhofer Institut für Bauphysik" at Stuttgart and is reported in the test report number P-BA 167/1999. According to prEN 12354-2:1996, a dynamic stiffness as low as 33 MN/m³ is required to achieve this performance with a conventional material.

Since the dynamic stiffness is defined as the dynamic modulus divided by the thickness of the material, a conventional material would need to be 60% thicker to achieve the same impact sound improvement level as the material in accordance with the present invention. Conversely, a substantially thinner foam insulation of the present invention may be used rather than a thicker foam from conventional material, thereby saving not only the material but also the space. The superior sound insulation performance of the foams of the present invention is believed partly to come from its higher damping capability than an EPS material. The foam of Example 12 showed a damping ratio of 18.8% as compared to 7.35 for the elastified EPS foam of Comparative Example 4. Ordinarily, a damping ratio above 10 would have a positive effect on impact sound insulation while one below 10 would have little effect on impact sound insulation.

TABLE 6

Acoustical Insulation Data

| Ex # | Foam | Dynamic Stiffness (MN/m³) | Thickness (mm) | Damping Ratio | ΔLw (dB) |
|---|---|---|---|---|---|
| Comp Ex 4 | Techmate AC | 32 | 17 | 18.8 | 25 |
| Ex 12 | Elastified Ex 7 | 52 | 10 | 7.3 | 25 |

What is claimed is:

1. A process for making an extruded soft foam having an Asker C hardness of less than about 65, which process comprises;
   (I) forming a melt polymer material comprising;
      (A) one or more alkenyl aromatic polymers, and wherein at least one of said alkenyl aromatic polymers has a molecular weight ($M_w$) of from about 100,000 to about 500,000; and
      (B) one or more substantially random interpolymers having an $I_2$ of about 0.1 to about 50 g/10 min, an $M_w/M_n$ of about 1.5 to about 20; comprising;
         (1) polymer units derived from;
            (a) at least one vinyl or vinylidene aromatic monomer, or
            (b) at least one hindered aliphatic or cycloaliphatic vinyl or vinylidene monomer, or
            (c) a combination of at least one aromatic vinyl or vinylidene monomer and at least one hindered aliphatic or cycloaliphatic vinyl or vinylidene monomer, and
         (2) polymer units derived from at least one of ethylene and/or a $C_{3-20}$ α-olefin; and
         (3) optionally polymer units derived from one or more of ethylenically unsaturated polymerizable monomers other than those derived from (1) and (2); and
      (C) optionally, one or more nucleating agents and
      (D) optionally, one or more other additives; and
   (II) incorporating into said melt polymer material at an elevated pressure to form a foamable gel (E) one or more blowing agents;

(III) cooling said foamable gel to an optimum temperature; and extrude said foamable gel from Step III either
   (a) through a die to a region of lower pressure to form a foam or,
   (b) into a holding zone maintained at a temperature and pressure which does not allow the gel to foam, the holding zone having an outlet die defining an orifice opening into a zone of lower pressure at which the gel foams, and an openable gate closing the die orifice; periodically opening the gate; substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and permitting the ejected gel to expand unrestrained in at least one dimension to produce the foam structure.

2. The process of claim 1 wherein said alkenyl aromatic polymer is a copolymer derived from an alkenyl aromatic compound and one or more $C_4$–$C_6$ dienes.

3. The process of claim 2 wherein said alkenyl aromatic polymer is selected from the group consisting of styrene/butadiene/styrene (SBS) and styrene/isoprene/styrene (SIS) copolymers.

* * * * *